July 24, 1962  W. B. CLARK  3,045,846
RACK UNLOADER
Filed Sept. 19, 1960  3 Sheets-Sheet 1
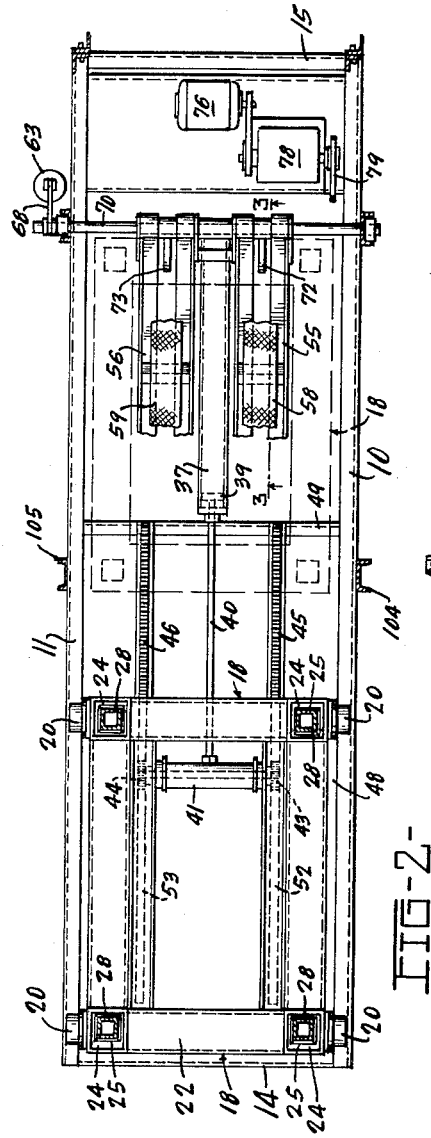
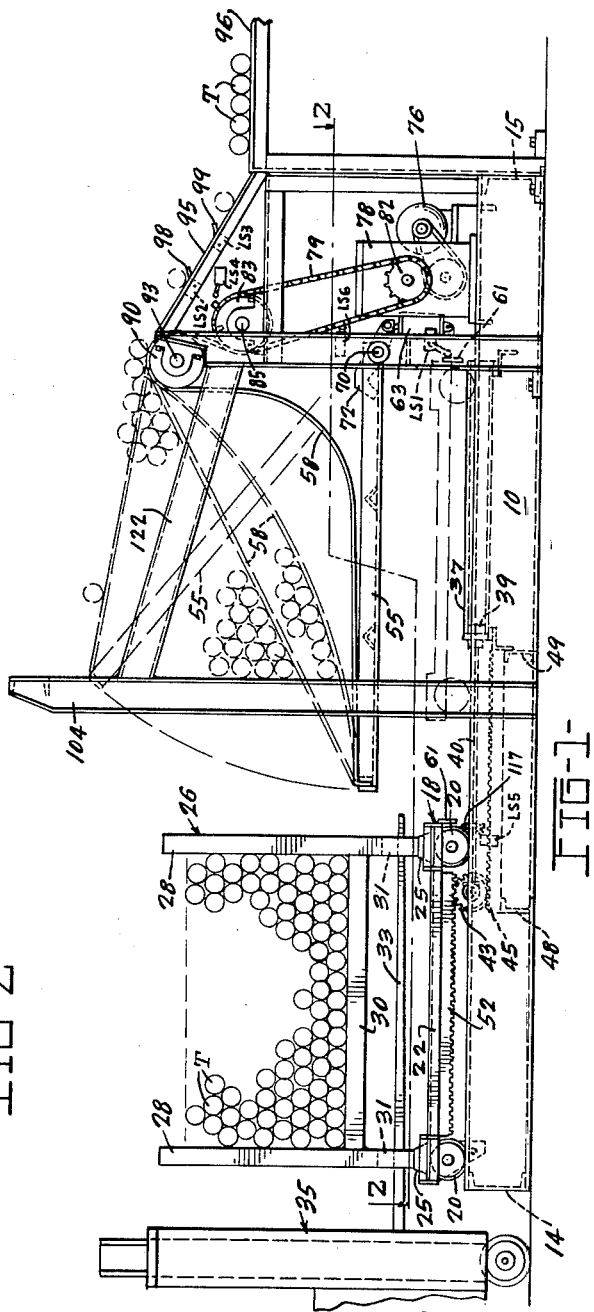
INVENTOR:
WILLIAM B. CLARK
BY
W. P. Carr
ATTORNEY.

July 24, 1962 W. B. CLARK 3,045,846
RACK UNLOADER
Filed Sept. 19, 1960 3 Sheets-Sheet 2
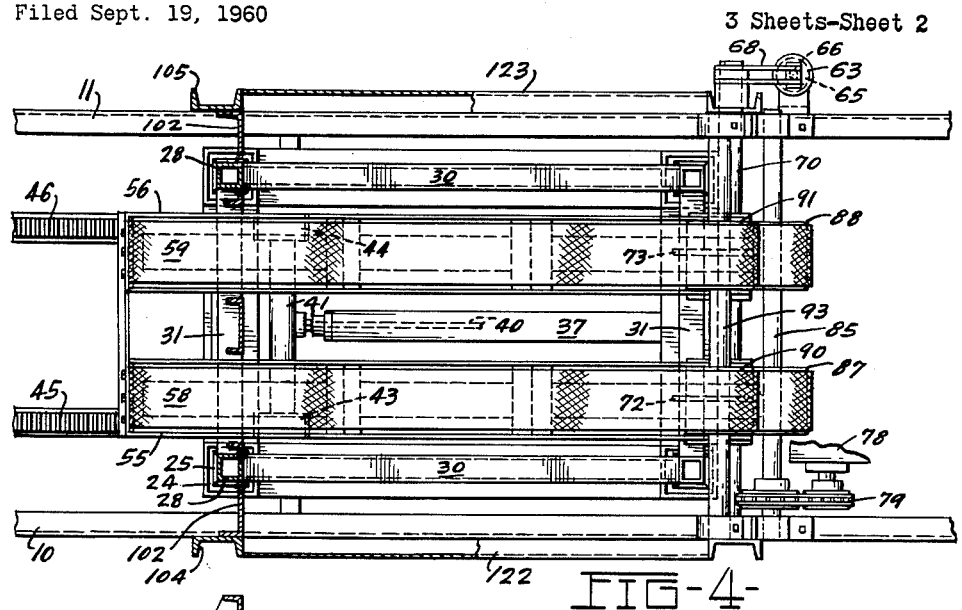
FIG-4-
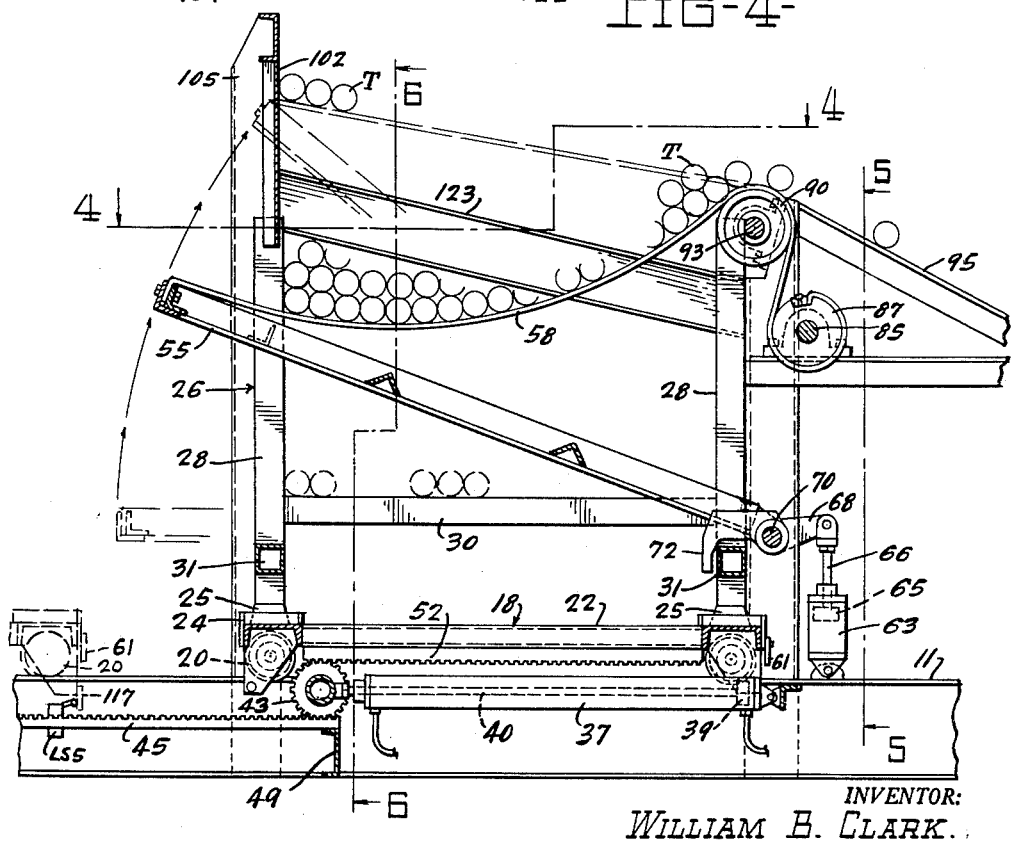
FIG-3-
INVENTOR:
WILLIAM B. CLARK.
BY
W.P. Carr
ATTORNEY.

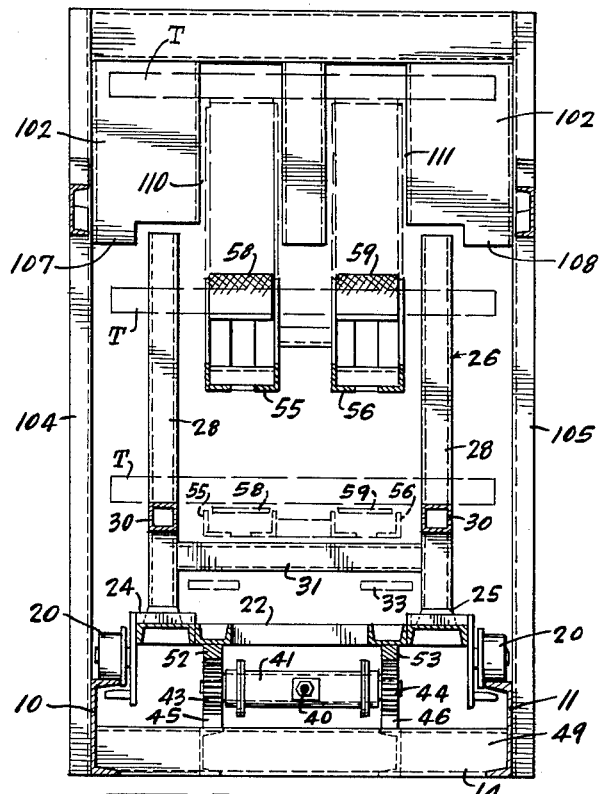
FIG-6-
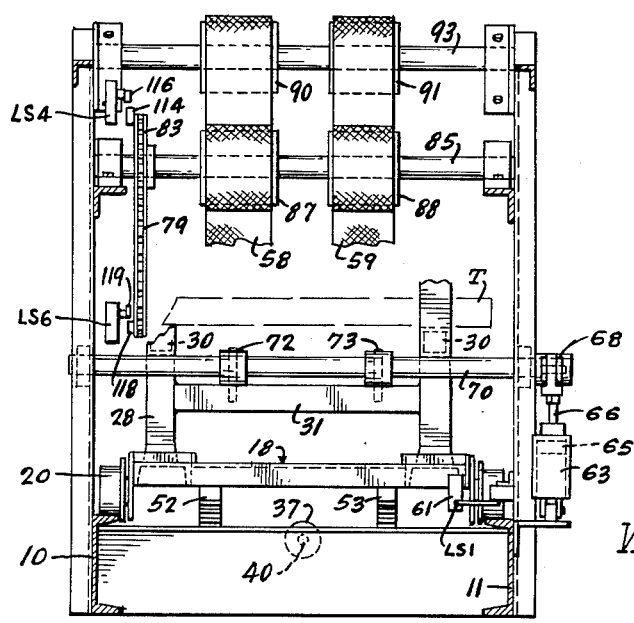
FIG-5-
INVENTOR:
WILLIAM B. CLARK.
BY
W. P. Carr
ATTORNEY.

United States Patent Office 3,045,846
Patented July 24, 1962

3,045,846
RACK UNLOADER
William B. Clark, Box 395, R.R. 1, Walbridge, Ohio
Filed Sept. 19, 1960, Ser. No. 56,912
13 Claims. (Cl. 214—310)

This invention pertains broadly to apparatus for receiving a rack loaded with elongated articles and removing the elongated articles from the rack in sequential order.

More particularly this invention relates to an apparatus for receiving a rack of tubes or the like from a lift truck or other conveying device, moving the rack into a tube unloading position, and unloading the tubes from the rack as required in a subsequent production operation.

The invention further relates to such an apparatus which is automatically controlled.

In a factory, such as an automobile plant, tubes are produced or purchased in long lengths and are cut to various shorter lengths depending upon their ultimate use which may be as steering column masts, shock absorber casings, drive shafts, tail pipes, and so forth. After being cut to proper lengths, the tubes are processed through numerous machining steps which may include swaging, crimping, threading, drilling and trimming.

In modern plants under high production, with fabricating equipment in continuous operation, the problem of storing and delivering tubes from one operation to the next has become of major importance. Hand methods have proved inadequate and other more effective means are constantly being adopted so as to expedite the over all operation.

Because of the lag due to storage and handling processes, this part of the activity of a plant has frequently constituted a prime factor in limiting production capacity.

The principal object of this invention is to facilitate the unloading of tubes or other elongated articles from a rack.

More specifically it is an object of this invention to provide apparatus for unloading elongated articles from a rack and mechanism for bringing the rack into position for actuation of such apparatus.

The apparatus provided by this invention for accomplishing the recited objects includes a carriage upon which a loaded rack may be deposited by a fork truck, and powered means for moving the carriage into a rack unloading station. At the station is an arrangement for inserting lifting belts under the elongated articles in the rack and raising the belts to discharge the articles from the rack. The apparatus will be described in more detail hereafter in connection with the particular embodiment shown in the accompanying drawings, in which:

FIGURE 1 is a side elevation of apparatus embodying one form of the invention;

FIGURE 2 is a horizontal section of the apparatus of FIGURE 1 as viewed in the direction indicated by the arrows on the line 2—2 of FIGURE 1;

FIGURE 3 is an enlarged vertical section of the main portion of the apparatus as viewed from line 3—3 of FIGURE 2;

FIGURE 4 is a plan view, with some parts in section, of the portion of the apparatus shown in FIGURE 3 from line 4—4 thereof;

FIGURE 5 is an end view of the apparatus, with some parts in section, as seen from line 5—5 of FIGURE 3; and FIGURE 6 is a vertical section crosswise through the apparatus looking to the left from the line 6—6 of FIGURE 3.

With more specific reference to the drawings, the apparatus as shown particularly in FIGURES 1, 2 and 5 has a supporting base including opposite side channel beams 10 and 11. These are positioned on edge with their flanges extending inwardly. The ends of the beams 10 and 11 are joined by cross channel members 14 and 15.

A rack supporting carriage 18 has flanged wheels 20 for which the tops of the beams 10 and 11 serve as a track. The rectangular frame 22 of the carriage 18 has corner sockets 24 for receiving the square outlined, flared feet 25 of a storage rack 26 of the design for which the apparatus of this invention is especially adapted.

The storage rack 26 has four corner posts 28, and two pairs of oppositely positioned cross bars 30 and 31. The top pair of bars 30 supports the tubes or other elongated articles being handled. For purposes of explanation the articles will be considered to be tubes as indicated at T. The fork 33 of a conventional lift truck 35 is inserted beneath the pair of bars 21 for raising and transporting the storage rack 26.

After a loaded rack 26 is deposited by a truck 35 upon the carriage 18, as illustrated in FIGURE 1, through depression of a starting button and an associated solenoid valve motivating fluid is directed to cylinder 37. This retracts the piston 39 and its extending rod 40 to the right, as viewed in FIGURES 1 and 2. The rod 40 is connected to the transverse member 41 on the ends of which are journalled pinion gears 43 and 44. These respectively engage the underlying gear racks 45 and 46, which are mounted upon the channels 48 and 49 extending crosswise between the base beams 10 and 11.

The pinion gears 43 and 44 also have toothed engagement with the superimposed gear racks 52 and 53 which are fixed to the underside of carriage frame 22. Through the association of the pinion gears with the two pairs of gear racks, the carriage 18 moves in following relation with the retracting piston rod 40 but at a double rate of travel.

As the carriage moves to the right, as may be seen in FIGURES 1 and 2, pivotable arms 55 and 56, to the ends of which belts 58 and 59 are fastened, are disposed in a horizontal position. The arms 55 and 56 are in a plane above the lower pair of cross bars 31 of the rack 26 and extend between and slightly below the top of the upper cross bars 30 of the rack. The arms with their associated belts are thus received beneath the tubes T carried in the rack.

When the piston 39 reaches the limit of its rightward movement a limit switch LS1, as shown in FIGURE 5, is tripped by the contact cam 61 depending from the adjacent forward corner of the carriage 18. The tripping of limit switch LS1 actuates a solenoid controlling fluid flow to the cylinder 63, which may be best seen in FIGURES 3 and 5. Through the consequential upward movement of the piston 65 and the piston rod 66, the rocker arm 68 to which the rod is connected, is moved upwardly. This rotates the shaft 70 to which arm 68 is fixed. The rotation of shaft 70 swings the pair of hooks 72 and 73 mounted on the shaft down into locking engagement over the more forward of the lower pair of rack cross bars 31. Arms 55 and 56 are loosely pivotable upon the shaft 70 and are therefore unaffected by the turning of this shaft.

Tripping of limit switch LS1 also energizes the electric motor 76 to start the wind-up of belts 58 and 59. Motor 76 functions through the gear reduction assembly 78, and chain 79 running between sprockets 82 and 83, to rotate shaft 85. Mounted on this shaft are belt drums 87 and 88 on which belts 58 and 59 are respectively wound. As the belts are slowly wrapped around drums 87 and 88, they pass over the upper idler pulleys 90 and 91 carried on the shaft 93.

The free ends of the belts initially lie within the confines of the vertical sides of the arms 55 and 56, to the ends of which the outer terminal portions of the belts are attached.

As the belts are shortened they tighten against and raise the tubes T within the rack. The belts assume a bowed shape, and exert a pulling action on the belt arms 55 and 56 and pivot them upwardly, as illustrated in FIGURE 3. The tubes T are thus raised until they successively spill over the top of idler pulleys 90 and 91 and descend the sloping ramp 95 to a processing station indicated at 96. If too many tubes collect at the station 96 they will hold a line of tubes on the ramp 95. This will simultaneously hold down the tripping pins 98 and 99 of the limit switches LS2 and LS3 depicted in FIGURE 1. This action stops motor 76 and interrupts the raising of the belts until the succession of tubes is released by consumption of the tubes at station 96.

In order to prevent the tubes, as they are elevated by the belts, from dropping over the rearward posts 28 of the rack 26 there is a blocking panel 102 supported upon uprights 104 and 105 as shown in FIGURE 6. The lower projections 107 and 108 of the panel extend down below the top of the posts 28 to form with the posts a continuous confining structure. Rectangular slot openings 110 and 111 in the panel provide paths for the rising belt arms 55 and 56. However, just before the ends of these arms quite reach the slots the belts have assumed the top position indicated in dotted lines in FIGURE 3 and all of the tubes have been discharged down the ramp 95.

As the belt arms 55 and 56 arrive at the limit of their upward movement a lug 114 on the belt winding chain 79, as illustrated in FIGURE 5, strikes the trip finger 116 of limit switch LS4. This acts through a suitable solenoid to reverse fluid flow to cylinder 63 and therethrough raise hooks 72 and 73. The tube rack is thus released from the grasp of the hooks upon the rack cross bar 31. After a timed delay actuating fluid is delivered to cylinder 37 to drive the carriage 18 and the empty rack thereon back to the starting position of FIGURE 1.

A limit switch LS5 is tripped by the return of the carriage, through the cam 117 depending therefrom. This switch starts the motor 76 in a reverse direction to unwind the belts from drums 87 and 88 and lower the belt arms 55 and 56.

While air under pressure is the preferred fluid medium for the various powered cylinders discussed herein, oil or other liquids may be utilized in place thereof.

The motor is stopped when a second lug 118 on the chain 79 hits the tripping pin 119 of limit switch LS6. This operation is timed with the arrival of the belt arms in a horizontal position and the dropping of the belts within the confines of the arms. Switch LS6 must be held by pin 119 in order for the starting button to move the carriage 18. The apparatus is now ready for the removal of the empty rack and the start of a new cycle of operation with the deposit of a loaded rack upon the carriage 18.

While two belts are incorporated in the disclosed apparatus, a larger number or a single belt may instead be used to adequately handle articles of different specifications.

The disclosed embodiment of the invention is a preferred form having automatic controls. Manually operated switches for effecting the successive actions of the apparatus would be feasible and under some circumstances more practical. The ramp 95 is moderately inclined to accommodate stock capable of rolling. A greater incline may be needed to permit articles of a more angular cross section to slide down the ramp to the processing station 96.

It may be seen from the preceding description that apparatus has been provided for efficiently accomplishing the recited objects and advantages of the invention.

The features which contribute importantly to the success of the invention include the carriage for receiving a rack and carrying it into unloading position, the driving mechanism for rapidly moving and accurately positioning the carriage, the rack locking means, the panel acting with the rack posts to form a continuing tube blocking and retaining wall, and the various, cooperating automatic control devices.

Although a particular embodiment of the invention has been shown and described, it will be understood that various modifications may be made therein without departing from the spirit of the invention and the scope of the accompanying claims.

I claim:

1. Apparatus for receiving a rack carrying elongated articles and successively unloading the articles therefrom, said rack being of the type having corner posts and a pair of parallel, opposed side bars across which the elongated articles are supported; said apparatus including a rack receiving station, a rack unloading station, a rack carriage, a track for the carriage between the receiving and unloading stations, means moving the carriage from the receiving to the unloading station, unloading means at the unloading station including pivotable arm means, a starting position for the pivotable arm means in a horizontal plane below elongated articles carried in a rack and between the rack side bars across which elongated articles are supported, a belt fastened to the outer end of the arm means and extending under articles in the rack, and means pulling the belt upwardly to raise the articles out of the rack, the arm means pivoting upwardly in following relation with the belt movement.

2. Apparatus according to claim 1 in which the means moving the carriage from the receiving to the unloading station comprises a rod, a pinion gear rotatably mounted on one end of the rod, a rack fixed to the carriage and engaged by the pinion gear, a stationary rack on the opposite side of the pinion gear from the carriage rack and also engaged by the pinion gear, and fluid actuated means having a driving connection with the rod.

3. Apparatus for unloading elongated articles from a portable rack in which the articles are supported in parallel arrangement across two opposed side bars between four corner posts; said apparatus including a carriage adapted for receiving such a rack filled with elongated articles, an unloading station, means for moving the carriage with a filled rack thereon into the station, unloading means at the station including a pivotable arm initially in a horizontal position and extending beneath the elongated articles in a rack moved to the station on the carriage and extending between the side bars of the rack, means holding the filled rack at the station, a belt fastened to the outer end of the arm and extending under articles in the rack, means pulling the belt upwardly to raise the articles out of the rack, the arm pivoting upwardly in following relation with the belt movement, a confining panel preventing the raised articles from spilling out over the corner posts at one side of the rack, and a ramp for receiving the articles as they spill out over the corner posts on the opposite side of the rack.

4. Apparatus according to claim 3 in which the confining panel has portions extending down below the top of the corner posts of a rack at the unloading station and has a slot opening into which the arm is free to move when raised.

5. Apparatus for unloading elongated articles from a portable rack in which the articles are supported in parallel arrangement across two side bars connecting corner posts of the rack; said apparatus including a carriage for a rack, a rack receiving station for the carriage, a rack unloading station for the carriage, means moving the carriage with a rack filled with elongated articles from the receiving station to the unloading station, a pivotable arm, a belt attached to the outer end of the arm, the arm being initially positioned horizontally beneath articles in a rack at the unloading station and between the side bars on which the articles are supported, means winding up the belt and thus raising the belt and the arm to which it is attached, the rising belt engaging and raising the articles in the rack, a blocking panel at one side of the rack preventing spilling of the articles therefrom, and a ramp on the other side of the rack for receiving articles as they are spilled from the rack by the rising belt.

6. Apparatus according to claim 5 in which there are means stopping the winding up of the belt when it has been raised sufficiently to unload all the articles from a rack.

7. Apparatus according to claim 5 in which there are means preventing movement of the carriage from the receiving station to the unloading station when the pivotable arm is raised from a horizontal position.

8. Apparatus for receiving a rack carrying elongated articles and successively unloading the articles therefrom, said rack being of the type having corner posts and a pair of parallel, opposed side bars across which the elongated articles are supported; said apparatus including a rack receiving station, a rack unloading station, a rack carriage, a track for the carriage between the receiving and unloading stations, means moving the carriage from the receiving to the unloading station, unloading means at the unloading station including a belt, means holding the belt in a starting position in a horizontal plane below elongated articles carried in a rack and between the rack side bars across which elongated articles are supported, and means raising the belt upwardly into raising contact with the elongated articles to unload them from the rack.

9. Apparatus according to claim 8 having a blocking panel at the unloading station cooperating with the posts on one side of the rack to prevent articles raised by the belt from being unloaded on that side and a declining ramp on the opposite side of the rack for receiving articles unloaded from the rack.

10. Apparatus for receiving a rack carrying articles and successively unloading the articles therefrom, said rack being of the type having corner posts and a pair of parallel, opposed side bars across which the elongated articles are supported; said apparatus including a rack receiving station, a rack unloading station, a rack carriage having corner sockets for receiving the bases of the corner posts of a rack, a track for the carriage between the receiving and unloading stations, means moving the carriage from the receiving to the unloading station, a clamp seizing and holding a rack brought to the unloading station on the carriage, unloading means at the unloading station including a belt, a pivotable arm holding the belt in a horizontal plane below elongated articles carried in a rack and between the rack side bars across which elongated articles are supported, and means tightening the belt and pivoting the arm upwardly and so raising the elongated articles upwardly out of the rack.

11. Apparatus according to claim 10 in which there is a shaft on which the clamp is mounted and the seizing action of the clamp is secured through rotation of the shaft, and the pivotable arm is loosely journalled upon the same shaft while the pivoted position of the arm is independent of rotating movement of the shaft.

12. Apparatus for unloading a rack of elongated articles, a rack receiving station, a rack unloading station, a track between the stations, a rack carriage adapted to travel on said track, said carriage having corner sockets for receiving the feet of a rack, driving mechanism for moving the carriage with a loaded rack thereon from the receiving station to the unloading station, a control device for the driving mechanism actuated by the arrival of the carriage at the unloading station to stop the driving mechanism, a pivotable hook adapted to lock a rack in position at the unloading station, means for pivoting the hook, said means actuated by said control device, and means at the unloading station for removing the elongated articles from the rack.

13. Apparatus according to claim 10 in which there are means responsive to the completion of the unloading of the rack effecting reverse pivoting of the hook to release the rack, and effecting reverse movement of the driving mechanism to return the carriage to the receiving station.

References Cited in the file of this patent

UNITED STATES PATENTS

| | | |
|---|---|---|
| 691,969 | Parker | Jan. 28, 1902 |
| 1,088,100 | Saunders et al. | Feb. 24, 1914 |
| 2,905,340 | Clark et al. | Sept. 22, 1959 |